United States Patent [19]
Yamamoto et al.

[11] Patent Number: 5,964,311
[45] Date of Patent: Oct. 12, 1999

[54] SNOWMOBILE STEERABLE SKI

[75] Inventors: Kazuhiro Yamamoto; Shizuo Kawano, both of Saitama, Japan

[73] Assignee: Honda Giken Kogyo Kabushiki Kaisha, Tokyo, Japan

[21] Appl. No.: 08/799,218

[22] Filed: Feb. 14, 1997

[30]     Foreign Application Priority Data

Feb. 16, 1996  [JP]  Japan ................................ 8-053758

[51] Int. Cl.⁶ .................................................. B62D 55/06
[52] U.S. Cl. ......................... 180/190; 180/193; 180/184
[58] Field of Search .................... 180/182, 183, 180/184, 190, 191; 280/601, 606, 607, 608, 610

[56]           References Cited

U.S. PATENT DOCUMENTS 3,252,533  5/1966  Aeder et al. .
4,823,903  4/1989  Bibollet et al. ........................ 180/193
4,893,692  1/1990  Smith ..................................... 180/190
5,203,424  4/1993  Gogo et al. ............................ 180/190
5,474,146  12/1995  Yoshioka et al. ..................... 180/184

FOREIGN PATENT DOCUMENTS 54-1721   1/1979  Japan .
3189289   8/1991  Japan .

*Primary Examiner*—Matthew C. Graham
*Attorney, Agent, or Firm*—Birch, Stewart, Kolasch & Birch, LLP

[57]                ABSTRACT

The weight and cost of a steerable ski can be reduced by providing a steerable ski formed of resin as a whole and which includes a hollow portion. The hollow portion is filled with a foamed material as required. Accordingly, the height in cross section of the steerable ski can be increased to thereby increase the modulus of section. As a result, the wall thickness of the steerable ski can be reduced to thereby prevent an increase in the weight and cost.

18 Claims, 4 Drawing Sheets

SNOWMOBILE STEERABLE SKI

BACKGROUND OF THE INVENTION

1. Field of the Invention

The present invention relates to a snowmobile having a steerable ski at a front portion of the snowmobile body and a power-driven endless track device at a rear portion of the snowmobile body.

2. Description of Background Art

Snowmobiles are known as disclosed, for example, in U.S. Pat. No. 3,252,533, Japanese Patent Laid-open No. Hei 3-189289, and Japanese Utility-model Publication No. Sho 54-1721.

In the snowmobile described in each of these publications, a steerable ski is formed of metal. The steerable ski is generally manufactured by the pressing of a thin plate of metal into the shape of a ski. An aluminum expanded member and a solid molding are also known as other materials for constructing a steerable ski. Furthermore, in the latter two of the above publications, an independent grip is mounted on the steerable ski at a front end portion thereof.

A conventional steerable ski has a thin wall thickness for the purpose of reducing the weight. As a result, the modulus of section of the steerable ski is small, so that the weight of the steerable ski is relatively large for its strength.

Furthermore, the grip and a front cover provided as required to cover a curved front end portion of the steerable ski are independent of a body portion of the steerable ski, causing an increase in weight and cost.

Furthermore, in the case where the steerable ski is formed of metal, it is necessary to mount a resin slider for preventing snow from sticking to a sliding surface of the steerable ski, thus similarly causing an increase in the weight and cost.

SUMMARY AND OBJECTS OF THE INVENTION

In a snowmobile having a steerable ski at a front portion of a snowmobile body and a power-driven endless track device at a rear portion of the snowmobile body, there is provided the improvement wherein the steerable ski is formed of resin and has a hollow portion. The hollow portion may be filled with foamed resin.

A front end portion of the steerable ski may be integrally formed with a grip.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a preferred embodiment of the present invention will be described with reference to the drawings.

Figure 4:
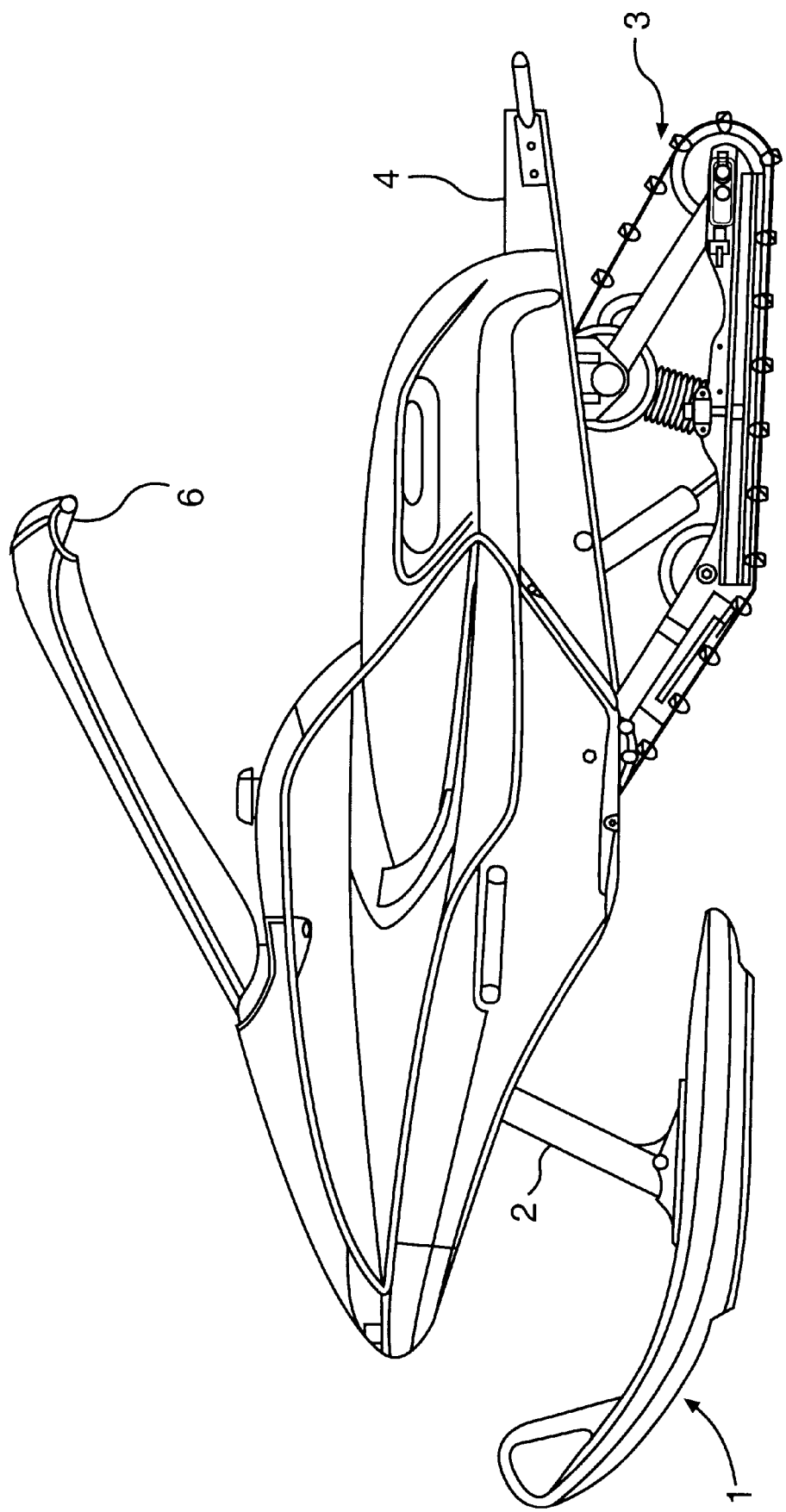
FIG. 4 is a side view of a snowmobile to which the present invention is applied.

FIG. 4 shows an external side view of a snowmobile to which the present invention is applied. A steerable ski 1 is supported through a front suspension 2 to a front portion of a snowmobile body of the snowmobile. An endless track device 3 is provided at a rear portion of the snowmobile body. The endless track device 3 is driven by the motive power of an engine not shown.

A floor 4 is provided above the endless track device 3. Handlebars 5 are operated by an operator standing on the floor 4. The handlebars 5 are vertically swingable. The handlebars 5 are also horizontally pivotable so as to rotate the suspension 2 about its axis and rotate the steerable ski 1 integrally with the suspension 2, thereby steering the steerable ski 1.

Figure 1:
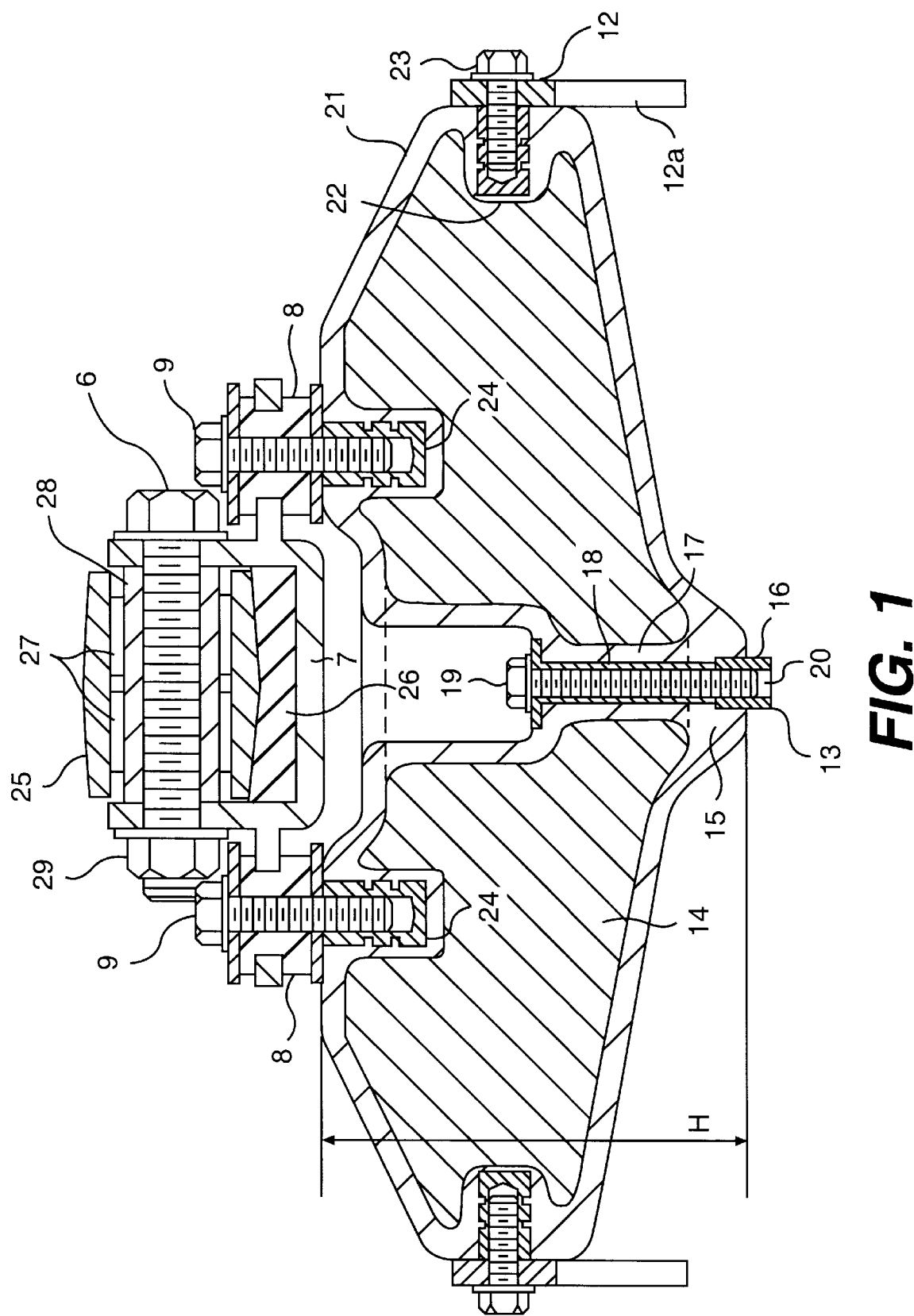
FIG. 1 is an enlarged cross section taken along the line 1—1 in FIG. 2.
Figure 2:
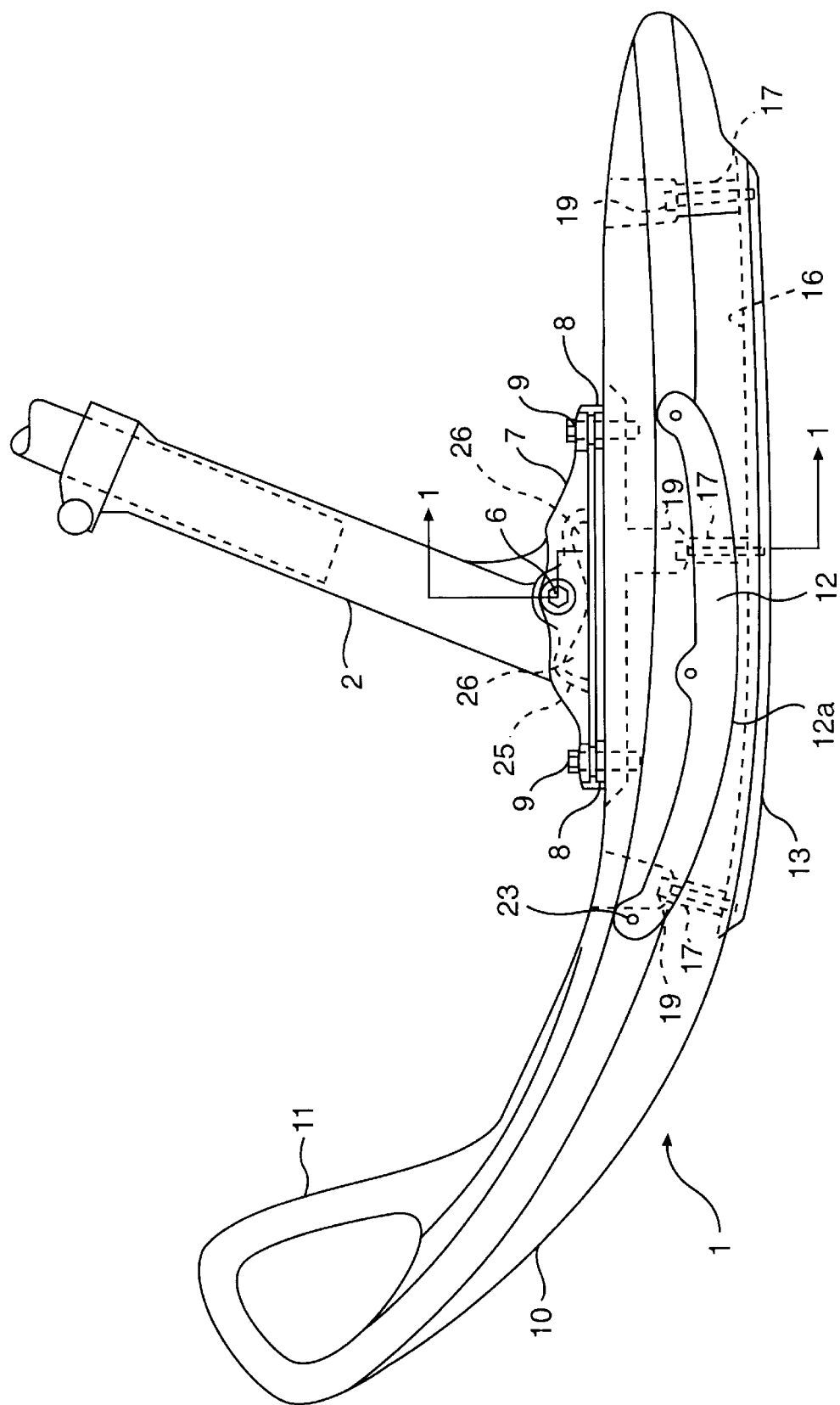
FIG. 2 is a side view of a steerable ski.
Figure 3:
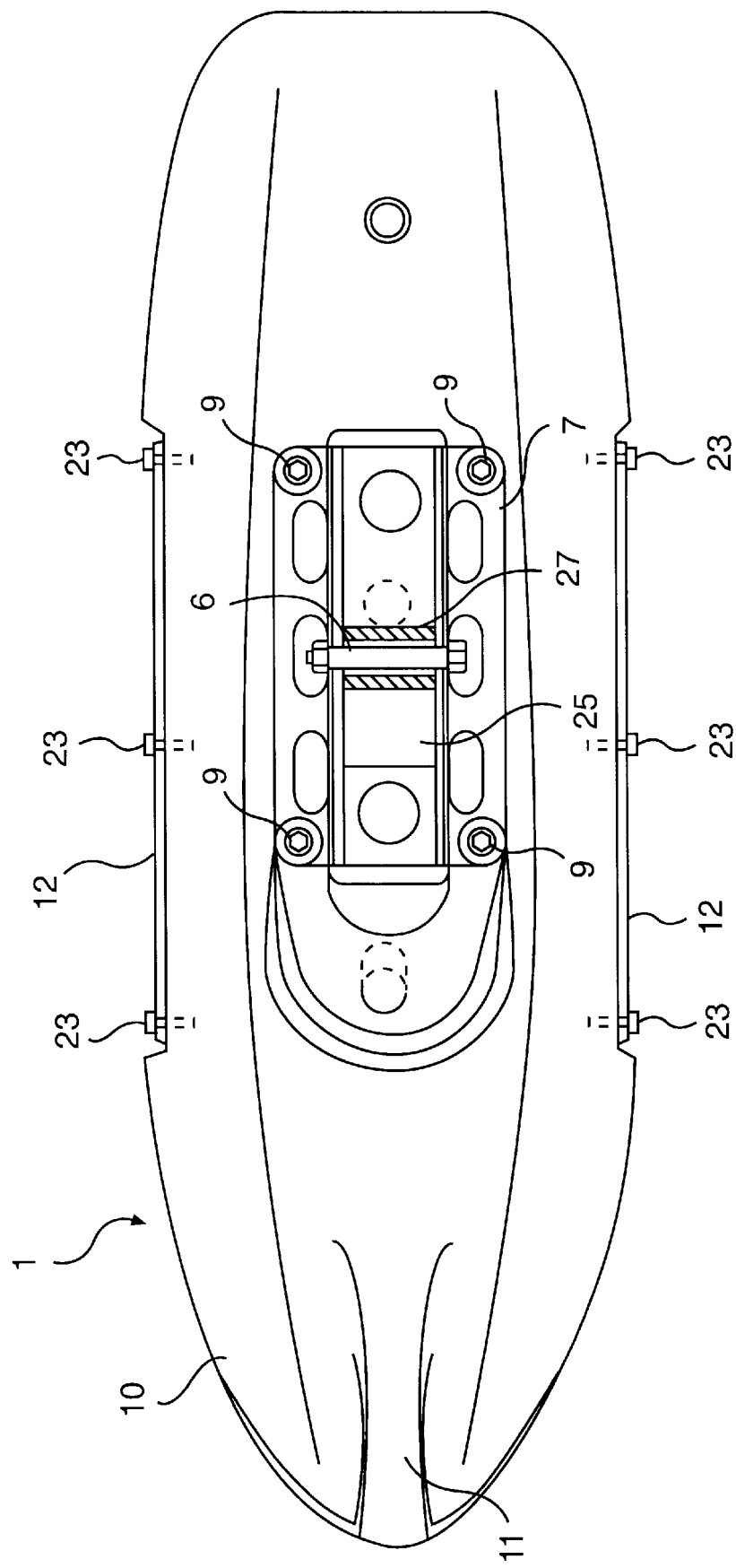
FIG. 3 is a top plan view of the steerable ski.

Referring to FIGS. 1 to 3, the steerable ski 1 is formed of a suitable synthetic resin such as polyethylene or polypropylene. A hollow portion is provided with a closed lateral cross section as illustrated in FIG. 1.

The front suspension 2 is of a known telescopic type, and is pivotably mounted at its lower end portion to a ski bracket 7 by a pivot shaft 6.

The ski bracket 7 is a member elongated in the longitudinal direction and includes a substantially U-shaped cross section such that opposite side portions are bent upwardly. The ski bracket 7 is mounted on the upper surface of the steerable ski 1 at its central portion by bolts 9 passing through rubber mounts 8.

As illustrated in FIG. 2, a front portion of the steerable ski 1 is formed as a front cover portion 10 tapered toward the front end and is largely curved upwardly. Furthermore, a front end portion of the steerable ski 1 is integrally formed at its lateral center with a grip 11 looped as viewed in the side elevation.

A pair of side edges 12 are formed of metal and are mounted on the right and left side surfaces of the central portion of the steerable ski 1. The side edges 12 include a lower portion 12a which extends below a lower surface of the steerable ski 1. A center edge 13 is formed of metal and is mounted on the bottom surface of the central portion of the steerable ski 1. The side edges 12 and the center edge 13 are elongated in the longitudinal direction.

As illustrated in FIG. 1, the hollow portion of the steerable ski 1 is filled with a suitable foamed material such as a polyurethane foam as required.

The bottom surface of the central portion of the steerable ski 1 is formed with a ridge portion 15 projecting downwardly. The ridge portion 15 is formed at its central portion with a groove 16 which is elongated in the longitudinal direction.

The ridge portion 15 and the upper surface of the central portion of the steerable ski 1 are connected integrally by a plurality of vertical ribs 17 which are formed like independent pillars.

The vertical ribs 17 are suitably spaced from each other in the longitudinal direction. A vertically extending boss hole 18 is formed through each vertical rib 17 at its central portion. A boss is engaged in the boss hole 18, and a bolt 19 is inserted in the boss from the upper side. The bolt 19 is screwed in a nut hole 20 of the center edge 13 which is preliminarily engaged in the groove 16. As an alternative method of mounting the center edge 13, it may be mounted integrally with the steerable ski 1 by insert molding.

The bottom surface of the steerable ski 1 is tapered so as to be inclined upwardly from the ridge portion 15 towards right and left portions 21. An insert nut 22 is embedded in each side portion 21. Each side edge 12 is mounted on each side portion 21 by screwing a bolt 23 into the insert nut 22.

Furthermore, a plurality of insert nuts 24 are also embedded in an upper central portion of the steerable ski 1. The bolts 9 inserted through the rubber mounts 8 are screwed into the insert nuts 24.

As shown in FIGS. 2 and 3, a lower end portion 25 of the front suspension 2 is elongated in the longitudinal direction. The bottom surface of the lower end portion 25 is formed with front and rear recesses. Rubber cushions 26 engaged in the front and rear recesses are interposed between the lower end portion 25 and the ski bracket 7.

As shown in FIG. 1, bearings 27 are provided at a bearing portion of the lower end portion 25 to be rotatably supported to the pivot shaft 6. In FIG. 1, a collar 28 and a nut 29 are provided for securing an end portion of the pivot shaft 6 which is formed like a bolt.

The operation of this preferred embodiment will now be described. As shown in FIGS. 1 and 2, the height H of the cross section of the steerable ski 1 is measured as a dimension between the upper surface and the lowermost portion (the ridge portion 15) of the bottom surface of the steerable ski 1. The height H can be made much greater than that of the conventional steerable ski, thereby increasing the modulus of section, because the steerable ski 1 is hollow.

Accordingly, if the strength of the steerable ski 1 is made the same as that of the conventional steerable ski, the wall thickness of the steerable ski 1 can be reduced by a reduction in strength to thereby reduce the weight.

In the case where the hollow portion of the steerable ski 1 is filled with the foamed material 14, the wall thickness can be further reduced to allow a further reduction in weight.

Furthermore, since the front cover 10 and the grip 11 are integral with the steerable ski 1, it is unnecessary to mount independent members as the front cover 10 and the grip 11 on the steerable ski 1 as in the prior art, thereby preventing an increase in weight and cost.

Furthermore, since the steerable ski 1 is formed of resin as a whole, the sliding surface becomes a resin sliding surface. Accordingly, it is unnecessary to provide a resin slider as an independent member, thereby similarly preventing an increase in weight and cost.

According to the present invention, the steerable ski is formed of resin and has a hollow portion. Therefore, the height of the cross section of the steerable ski can be made much greater than that of the conventional steerable ski, thereby increasing the modulus of section.

Accordingly, the weight of the steerable ski can be reduced for its strength. That is, if the strength of the steerable ski according to the present invention is made the same as that of the conventional steerable ski, the wall thickness can be reduced by a reduction in strength to thereby reduce the weight.

Furthermore, as compared with the metal steerable ski in the prior art, it is unnecessary to mount a resin slider for preventing snow from sticking to the sliding surface. Also from this viewpoint, the weight and cost can be reduced.

In the case where the hollow portion of the steerable ski is filled with a foamed material, the wall thickness can be further reduced to allow a further reduction in weight.

In addition, the front cover portion and the grip are integral with the steerable ski, it is unnecessary to mount independent members as the front cover portion and the grip on the steerable ski as in the prior art. Also from this viewpoint, an increase in weight and cost can be prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A steerable ski adapted to be used with a snowmobile wherein said steerable ski is mounted to a front center portion of a snowmobile body and a power-driven endless track device is positioned at a rear portion of said snowmobile body, the improvement comprising:

said steerable ski having an outer surface being formed of resin with a hollow interior portion, said hollow interior portion being substantially completely filled with a foamed resin;

a groove formed on a lower surface of said steerable ski; and a center edge positioned in said groove, said groove extending substantially an entire length of said center edge.

2. A steerable ski adapted to be used with a snowmobile wherein said steerable ski is mounted to a front center portion of a snowmobile body and a power-driven endless track device is positioned at a rear portion of said snowmobile body, the improvement comprising:

said steerable ski having an outer surface being formed of resin with a hollow interior portion, said hollow interior portion being substantially completely filled with a foamed resin; and a plurality of ribs spaced along a length of said steerable ski, said plurality of ribs extending through said hollow interior portion from said lower surface to an upper surface of said steerable ski.

3. The steerable ski according to claim 2, wherein each one of said plurality of ribs includes a hole extending vertically therethrough, and a bolt extends through the hole from said upper surface of the steerable ski and attaches to the center edge.

4. The steerable ski according to claim 1, wherein said foamed resin is polyurethane foam.

5. The steerable ski according to claim 1, wherein said resin is polyethylene.

6. The steerable ski according to claim 1, wherein said resin is polypropylene.

7. The steerable ski according to claim 1, and further including a grip integrally molded with said outer surface on a front end portion of said steerable ski.

8. The steerable ski according to claim 1, and further including a ridge portion formed on said lower surface of said steerable ski, said groove being formed in said ridge portion.

9. The steerable ski according to claim 1, and further including side edges mounted on a right and left side surface of said steerable ski.

10. A steerable ski adapted to be used with a snowmobile comprising:

an outer housing formed by a top wall, a bottom wall, a left side edge and a right side edge, said outer housing being formed of a resin;

a hollow interior portion formed by said top wall, said bottom wall, said left side edge and said right side edge of said outer housing;

a grip integrally molded with said outer housing on a front end portion of said steerable ski;

a groove formed on said bottom wall of said steerable ski; and a center edge positioned in said groove, said groove extending substantially an entire length of said center edge.

11. The steerable ski according to claim 10, and further including side edges mounted on said right side edge and said left side edge of said steerable ski.

12. The steerable ski according to claim 10, wherein said hollow portion is filled with foamed resin.

13. The steerable ski according to claim 10, and further including a ridge portion formed on said bottom wall of said steerable ski, said groove being formed in said ridge portion.

14. The steerable ski according to claim 10, wherein said hollow portion is filled with polyurethane foam.

15. The steerable ski according to claim 10, wherein said resin is polyethylene.

16. The steerable ski according to claim 10, wherein said resin is polypropylene.

17. A steerable ski adapted to be used with a snowmobile comprising:

an outer housing formed by a top wall, a bottom wall, a left side edge and a right side edge, said outer housing being formed of a resin;

a hollow interior portion formed by said top wall, said bottom wall, said left side edge and said right side edge of said outer housing;

a grip integrally molded with said outer housing on a front end portion of said steerable ski; and a plurality of ribs spaced along a length of said steerable ski, said plurality of ribs extending through said hollow interior portion from said bottom wall to said top wall of the steerable ski.

18. The steerable ski according to claim 17, wherein each one of said plurality of ribs includes a hole extending vertically therethrough, and a bolt extends through the hole from said top wall of the steerable ski and attaches to the center edge.

* * * * *